United States Patent Office 3,837,995
Patented Sept. 24, 1974

3,837,995
AUTOGENOUSLY BONDED COMPOSITE WEB
John G. Floden, Appleton, Wis., assignor to Kimberly-Clark Corporation, Neenah, Wis.
Filed Apr. 24, 1972, Ser. No. 247,130
Int. Cl. B32b 5/02; D04h 1/04
U.S. Cl. 161—150
10 Claims

ABSTRACT OF THE DISCLOSURE

Autogenously bonded multi-ply nonwoven web including one or more layers of synthetic, thermoplastic polymeric microfibers and one or more layers of larger diameter natural fibers. Bonding is obtained between the layers of synthetic microfibers and the layers of natural fibers by contact without the need for supplemental bonding. The resulting composite webs are strong, conformable and possess other desirable properties depending upon the particular layer components utilized.

BACKGROUND OF THE INVENTION

1. Field of the Invention

This invention releates to low-cost nonwoven webs having an inter-bonded multi-ply construction. More particularly, it concerns such composite webs that include at least one layer substantially composed of synthetic thermoplastic microfibers and at least one layer substantially composed of natural fibers. Webs of this nature have utility as textile replacements and for general disposable or limited use applications.

2. Description of the Prior Art

It is known to form webs of synthetic, thermoplastic polymeric microfibers. For example, work done at the Naval Research Laboratories in Washington, D.C. is described by Van A. Wendt in an article entitled "Superfine Thermoplastic Fibers" appearing in Industrial & Engineering Chemistry, Volume 48, No. 8, pp. 1342–1346. It is further known to combine these microfibrous webs with other layers or components to form filter material or the like. However, it has heretofore been considered necessary to supplement the interlayer bonding of such composite webs. Thus, use has been made of adhesives, mechanical bonding, or hot melting techniques to provide adequate bonding. These bonding steps have inherently added to the cost of the resulting material as well as having an adverse affect on desirable properties such as hand and softness thus hindering its finding a place in the extremely price-conscious disposable and limited use industries.

SUMMARY OF THE INVENTION

Briefly, in accordance with the invention, there is provided an autogenously bonded composite web comprising one or more layers substantially composed of synthetic, thermoplastic, polymeric microfibers and one or more layers substantially composed of natural fibers. The synthetic microfiber and natural fiber layers may be bonded to each other simply by contact. Preferably, the polymeric microfibers have diameters of 10 microns or less and the natural fibers have larger diameters in the range of from about 10 to 50 microns.

The resulting composite web is soft, strong and conformable in light weights. Embodiments include structures wherein one or two microfiber layers are exposed and wherein one or two natural fiber layers are exposed.

DESCRIPTION OF THE PREFERRED EMBODIMENTS

Figure 1:
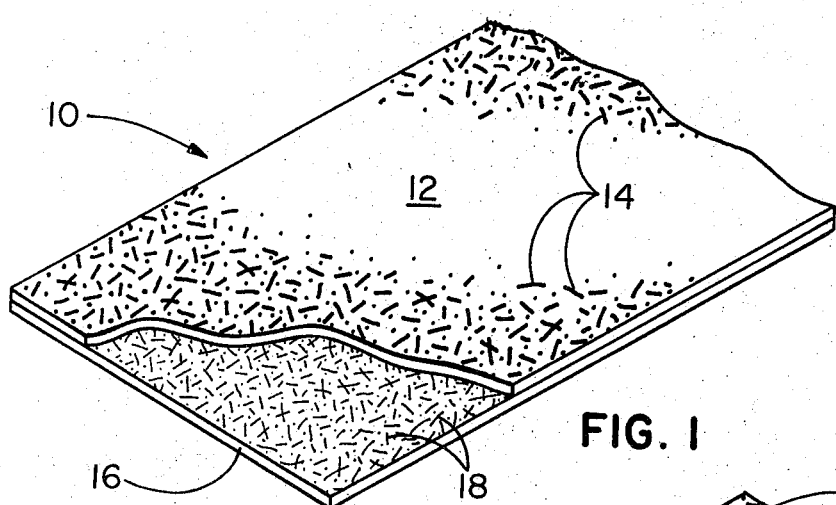
FIG. 1 illustrates schematically an embodiment of the invention showing a two-layer structure where one layer is composed of microfibers and the other layer is composed of larger diameter natural fibers.

The preparation of conventional disposable or limited use materials including a plurality of layers usually has required that steps be taken to supplement the interlayer attachment. This has been achieved, for example, by activating a thermoplastic layer, by utilizing an adhesive, or by physical means such as needle punching. Oftentimes the gross properties of the resulting combination of layers are undesirably affected by such treatments producing a harsh or stiff product. The composite web of the present invention does not require supplemental interlayer bonding for adequate inter-layer bonding and, therefore, avoids these as well as other undesirable side effects.

As used herein the term "microfiber" is defined as fibers or filaments having a diameter of less than 10 microns.

The term "natural fiber" as used herein includes those materials occurring naturally as fibers such as wool, wood fibers, cotton, flax, jute, and silk as well as those manufactured from natural polymer sources including rayon and which have an average fiber or fiber bundle diameter of 10 microns or more.

The term "synthetic thermoplastic polymer" is intended to include all man-made polymers and blends of such polymers capable of melt extrusion into microfibers. This embraces, in particular, polyolefins, polyesters, polyamides, and polyacrylates.

The term "autogenously bonded" is used to describe the tendency of the two layers to adhere to each other when the surfaces are brought into contact. These bonds need not be supplemented by chemical adhesives or physical attachment in most cases and generally are at least about 0.40 g./cm. as measured with an Instron Universal Test Instrument using the "A" cell attachment and set for maximum sensitivity.

The synthetic thermoplastic microfibrous layer is composed substantially of fibers having an average diameter of 10 microns or less and, preferably, from 2 to 6 microns. A minor proportion of larger diameter fibers may be tolerated. In general, the particular polymer is not critical; however, hydrophobic polymers such as the polyolefins (particularly polypropylene), polyesters, and polyamides are preferred. The web weight for the microfibrous layer is not critical but usually varies between the range of 0.5 to 30 grams per square meter for disposable or limited use applications depending upon the properties desired in the composite structure. Increased web weights result in higher overall strength and opacity. For most such uses the web weight range of between 5 to 20 grams per square meter is preferred. While the particular length of these fibers is not critical, they are usually discontinuous when formed. The method for forming such fibers is not a part of this invention, and that which is described, for example, in the article by Wendt *supra* as well as Naval Research Laboratory Report *111437* dated Apr. 15, 1954 entitled "Manufacture of Superfine Organic Fibers" may be used. Generally, the process involves the extrusion of molten polymeric material into fine streams and attenuating them by opposing flows of high velocity, heated gas, usually air. As formed the web displays some two-sidedness with the surface contacting the collector being generally more free from loose and extended fibers. It is preferred that, when bonding to the other layer, the microfibrous web be positioned with the belt side (surface contacting collector) exposed in the resulting composite. This generally results in stronger interlayer bonding due to the greater degree of fiber entanglement.

The layer of natural fibers may be dry or wet formed and have a thickness of generally from ½ to 50 and preferably from 1 to 5 time the thickness of the microfibrous layer as measured by an Ames Bulk Tester Model No. 13. The average diameter size of the natural fibers is not critical so long as they are larger than the microfibers and form a desired web construction. For example, fiber or fiber bundle diameters of about 10 to 50 microns have been used, and the range of from 30 to 40 microns is preferred. The fibers may be woven or nonwoven, continuous or discontinuous, and the layer may include one or more separate plies. An example includes wet laid wood fibers (about 20 to 40 microns) such as tissue and creped wadding. Depending upon the absorbency and permanency desired, other examples include cotton fibers, rayon fibers, wool, jute, and flax. Fiber blends containing a substantial proportion, e.g. at least 10% of natural fibers with other fibers may also be used. It will be recognized that where multi-plies of the natural fiber layers are used without an intervening layer of the microfibrous material, supplemental bonding may be required between the natural fiber layers. This may be accomplished in a manner well known to the art, for example, by pressure embossing, adhesives, needling or the like.

It has been found that the highest degree of autogenous bonding takes place when the layer of natural fibers possess at least a minimum degree of surface porosity. For example, very weak bonding is achieved with electrical tissue paper such as that used for capacitors since that paper is necessarily free from voids to a great degree, having a mean pore size of about 6–7 microns as measured by an Aminco motor driven 15,000 p.s.i. capacity mercury porosimeter. The exact limit of surface mean pore size which may be useful depends upon the desired interlayer bond strength. In general, however, the natural layer desirably has a surface mean pore size of at least about 12 microns and preferably at least 25 microns.

Bonding of the microfibrous layer to the natural fiber layer is achieved by bringing the surface into intimate contact. For example, the layers may be passed between kissing rolls or drawn over an idler roll to achieve satisfactory results. Other ways to apply this pressure will be apparent to those skilled in this art. It is only important that intimate contact be obained between the two layers. Therefore, the bonding can be achieved with a minimum of undesirable effects on the gross composite structure and properties.

While the nature of the interlayer bonds is not clearly understood and it is not desired that the invention be limited to any particular theory, it is believed that a combination of mechanical (physical) and electrostatic bonding takes place. When separating bonded layers, it can be observed that the microfibers are pulled away thus suggesting that some physical attachment has taken place. Also, it is possible to measure an electrostatic charge on the microfibrous layer which indicates electrostatic bonding. In any event, the bond is very adequate for most uses in the disposable or limited use area requiring bond strengths up to about 1.5 g./cm.

EXAMPLES

Example 1

In this example the natural fiber web was facial tissue grade creped wadding (equivalent to a single ply Kleenex® facial tissue) having a basis weight of about 15 grams per square meter. The microfiber web was melt blown polypropylene having an average fiber diameter generally in the range of from 2 to 6 microns and randomly formed in accordance with the process described by the above-mentioned Wendt article which is incorporated herein by reference. The basis weight of the microfiber web was also about 15 grams per square meter.

One ply of the natural fibers was brought into intimate contact with a ply of the microfibrous material by drawing over an idler roll. The resulting interbonded composite web had excellent appearance, good hand, and was very conformable.

FIG. 1 illustrates this embodiment schematically showing composite web 10 including layer 12 composed of natural fibers 14 and layer 16 composed of thermoplastic microfibers 18.

Example 2

In this example, a three-ply composite was formed having an outer ply of the creped wadding of Example 1 on each side of the microfibrous web of Example 1. The thress plies were brought into intimate contact by drawing them over an idler roll. The resulting interbonded composite web was still very conformable, as in Example 1, but easier to handle.

Figure 2:
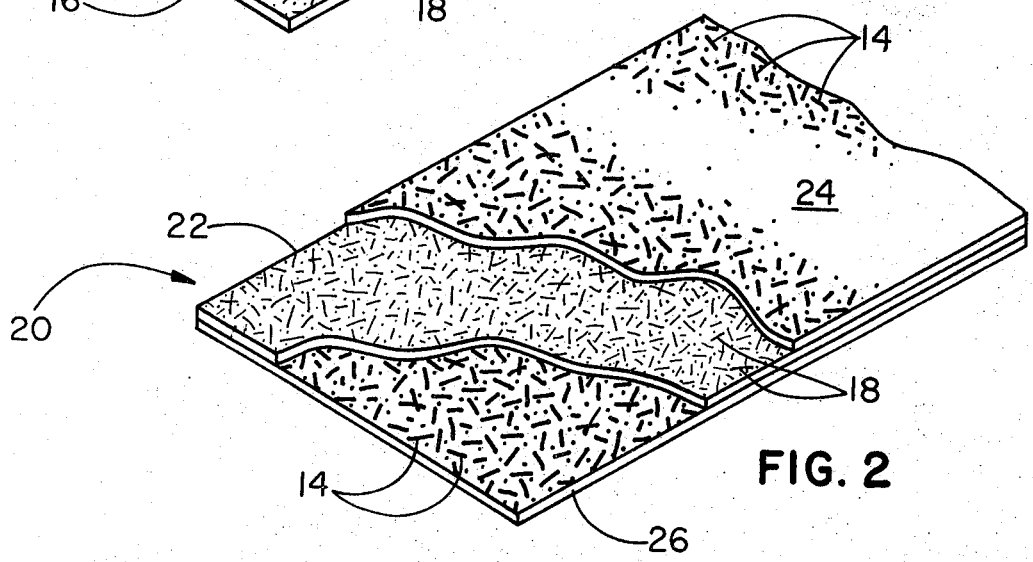
FIG. 2 illustrates schematically a second embodiment where the microfibrous layer is covered on both sides by natural fiber layers.

FIG. 2 schematically illustrates this embodiment showing composite web 20 including a layer 22 of thermoplastic microfibers 18 between two layers 24 and 26 of natural fibers 14.

Example 3

In this example a three-ply composite was formed having an outer ply of the microfibrous web of Example 1 on each side of the creped wadding of Example 1. The three plies were brought into intimate contact by drawing over idler rolls. The resulting interbonded composite web was strong and very conformable.

Figure 3:
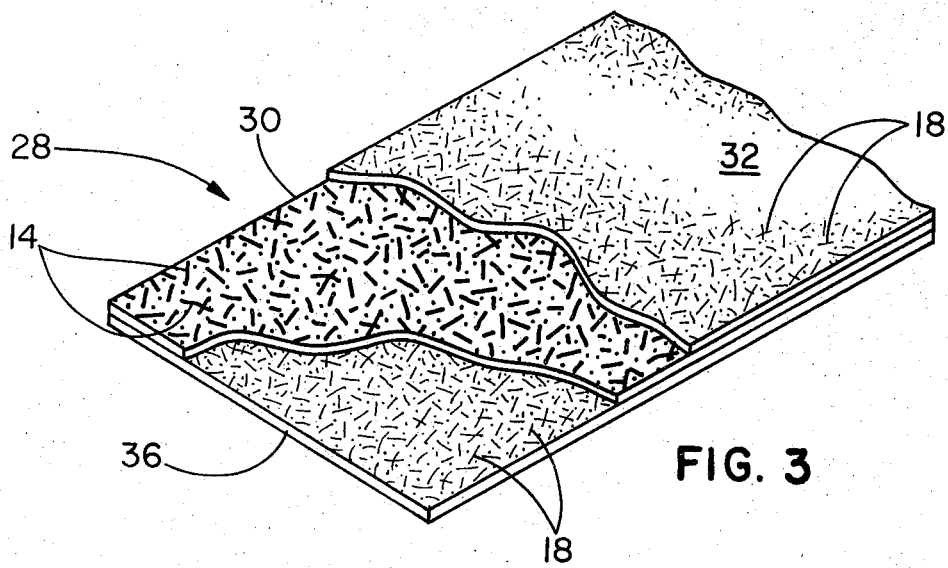
FIG. 3 illustrates schematically the embodiment where the natural fiber layer is covered on both sides with layers of microfibrous material.

FIG. 3 illustrates schematically this embodiment showing composite web 28 including a layer 30 of natural fibers 14 between two layers 32 and 36 of thermoplastic microfibers 18.

Example 4

Example 1 was repeated with a spun-bonded continuous filament polypropylene web having basis weight of about 17 grams per square meter, and average fiber diameter of about 15 to 17 microns replacing the creped wadding. The interlayer bonding was so low that the layers fell apart.

Example 5

Example 1 was repeated with two layers of the creped wadding. Again there was a lack of interlayer adhesion of the plies which could be very easily separated by hand.

Example 6

Example 1 was repeated with the creped wadding layer replaced by capacitor tissue (highly refined unbleached Kraft with surface mean pore size of about 6.4 microns) having a basis weight of about 8.1 grams per square meter. Interlayer bonding was very low illustrating that a certain degree of surface porosity or roughness contributes to the bonding which occurred in Examples 1 to 3.

Examples 7 to 10

Example 1 was repeated with the creped wadding layer replaced by the following natural fiber webs: cotton (woven, average fiber diameter of about 10 to 22 microns, and web basis weight of 110 grams per square meter); rayon (woven, average fiber diameter of about 15 to 40 microns, and web basis weight of 216 grams per square meter); wool (woven, average fiber diameter of about 17 to 40 microns and web basis weight of 196 grams per square meter); flax (woven, average fiber diameter of about 21 to 50 microns, and web basis weight of about 307 grams per square meter).

In all cases adequate interlayer bonding was obtained.

Examples 11 and 12

Example 1 was repeated with microfibrous webs formed from the following thermoplastic, synthetic polymers:

nylon (average fiber diameter about 2 to 6 microns, and basis weight of 20 grams per square meter); and polyethylene terephthalate (average fiber diameter about 2 to 6 microns, and basis weight of 16.5 grams per square meter).

These examples are summarized in Table I, which also includes results of tests to determine interlayer bonding (Instron Universal Test Instrument with A Cell attachment set for maximum sensitivity), composite tensile (Instron), energy absorption (Instron), bulk (Ames Bulk Tester Model No. 13), and drape (Handleometer—lower reading=limper material):

TABLE I

| Example | Microfiber polymer | Natural fiber | Total No. of plies | Weight microfibers, gr./M² | Weight natural fiber, gr./M² | Weight cont. fiber | Interlayer bond, gr./cm. | Composite tensile, grams/3 in. | | Composite energy absorbed, g. | | Bulk, in. | Handleometer | |
|---|---|---|---|---|---|---|---|---|---|---|---|---|---|---|
| | | | | | | | | MD | CD | MD | CD | | MD | CD |
| 1a | PP | CW | 2 | 8.01 | 15.77 | | .9 | ¹1,187 | 570 | 1,000 | 1,324 | .0080 | 4.6 | 2.8 |
| 1b | PP | CW | 2 | 9.98 | 15.77 | | .5 | ²1,180 | 738 | 1,520 | 1,490 | .0089 | 3.0 | 2.4 |
| 1c | PP | CW | 2 | 15.42 | 15.77 | | .5 | 2,048 | 1,323 | 2,836 | 3,240 | .0099 | 7.4 | 5.4 |
| 1d | PP | CW | 2 | 16.32 | 15.77 | | .25 | 1,880 | 1,222 | 2,784 | 2,288 | .0113 | 9.4 | 6.2 |
| 2 | PP | CW | 3 | 7.42 | (2) 31.00 | | .8 | ³1,719 | 417 | 1,530 | 1,488 | .011 | 6.4 | 5.3 |
| 3 | PP | CW | 3 | (2) 20.42 | 15.77 | | 1.2 | ⁴2,373 | 1,095 | 1,182 | 2,076 | .015 | 6.5 | 5.4 |
| 4 | PP | None | 2 | 15.42 | | 15.00 | 0 | ⁵5,430 | 3,582 | 2,976 | 1,740 | .014 | 16.4 | 15.0 |
| 5 | None | CW | 2 | | 31.54 | | .08 | 764 | 206 | 340 | 42 | .007 | 7.0 | 7.9 |
| 6 | PP | Kraft | 2 | 15.42 | 8.10 | | 0 | ⁶309 | | 8.4 | | .006 | 4.3 | 2.8 |
| 7 | PP | Cotton | 2 | 15.42 | 110.51 | | .88 | | | | | .013 | 39.5 | 20.0 |
| 8 | PP | Rayon | 2 | 15.42 | 216.71 | | .68 | | | | | .022 | 106.0 | 56.0 |
| 9 | PP | Wool | 2 | 15.42 | 196.62 | | .76 | | | | | .035 | 40.0 | 22.0 |
| 10 | PP | Flax | 2 | 15.42 | 307.13 | | 1.9 | | | | | .04 | 308.0 | 102.3 |
| 11 | Nylon | CW | 2 | 20.18 | 15.77 | | 2.6 | ⁷1,140 | 729 | 963 | 610 | .017 | 5.4 | 4.0 |
| 12 | PEster | CW | 2 | 16.51 | 15.77 | | 2.9 | 1,152 | 669 | 1,041 | 651 | .017 | 5.2 | 3. |

¹ FS 2,000 gr., CT 20″/min., CH 20″ min.
² FS 10,000 gr., CT 20″/min.
³ FS 5,000 gr., CT 20″/min.
⁴ FS 2,000 gr., CT 20″/min.
⁵ FS 5,000 gr., CT 20″/min.
⁶ FS 1,000, CT 20″/min., CH 2″/min.
⁷ FS 2,000, CT 20″/min., CH″/min.

As the foregoing demonstrates, the present invention provides a unique web composite having the desirable properties of each of its components including strength and drapability contributed by the microfibrous layer as well as opacity or other desired properties contributed by the natural fiber layers. These attributes result from the fact that supplemental bonding is not required to unite the microfibrous and natural fiber layers. When desired, however, these composite webs may be treated as by means of adhesives, fire retardants, or other finishes, for example, to develop specific properties in the same manner as with conventional disposable/limited use materials.

Thus it is apparent that there has been provided in accordance with the invention an improved self-bonded composite web that fully satisfies the objects, aims and advantages set forth above. While the invention has been describe in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. A composite web of multi-layer construction comprising, in combination,
a layer having a web weight of from 0.5–30 g./m.² and substantially composed of synthetic, thermoplastic polymeric microfibers having a diameter range of up to 10 microns and
autogenously bonded to said microfiber layer, a layer having a mean surface pore diameter in excess of 12 microns and substantially composed of natural fibers having a diameter range of from about 10 to about 50 microns,
said interlayer autogenous bonding having a strength of at least about 0.4 grams per centimeter which results solely from bringing the layers into intimate contact without the use of supplemental bonding means 2. The composite of claim 1 wherein said microfibers are selected from the group consisting of polyolefins, polyesters, polyamides, and polyacrylates.

3. The composite of claim 1 wherein said natural fibers are selected from the group consisting of cellulose, cotton, silk, wool, flax and jute.

4. The composite of claim 1 comprising a layer of polypropylene microfibers bonded to a layer of cellulose fibers.

5. The composite of claim 1 comprising a layer of polypropylene microfibers having a layer of cellulose fibers bonded to each of its opposing surfaces.

6. The composite of claim 1 comprising a layer of cellulose fibers having a layer of polypropylene microfibers bonded to each of its opposing surfaces.

7. The composite of claim 1 wherein said microfibers are selected from the group consisting of polyolefins and said natural fibers are selected from the group consisting of cellulose and wool.

8. The composite of claim 4 wherein said natural fibers comprise a layer of creped wadding.

9. The composite of claim 4 wherein said natural fibers comprise a layer of tissue.

10. The composite of claim 1 wherein the total thickness of each natural fiber layer is in the range of from about 0.5 to 50 times the thickness of each microfiber layer.

References Cited

UNITED STATES PATENTS

| | | | |
|---|---|---|---|
| 2,988,469 | 6/1961 | Watson | 161—150 X |
| 3,485,705 | 12/1969 | Harmon | 161—150 X |
| 3,649,428 | 3/1972 | Hughes | 161—150 X |
| 3,695,985 | 10/1972 | Brock et al. | 161—150 X |
| 2,357,392 | 9/1944 | Francis | 264—122 |

FOREIGN PATENTS 1,217,892  12/1970  Great Britain.

L. T. KENDELL, Assistant Examiner

GEORGE F. LESMES, Primary Examiner

U.S. Cl. X.R.

156—306; 161—151, 152, 153

PO-1050
(5/69)

UNITED STATES PATENT OFFICE
CERTIFICATE OF CORRECTION

Patent No. 3,837,995        Dated September 24, 1974

Inventor(s) John G. Floden

It is certified that error appears in the above-identified patent and that said Letters Patent are hereby corrected as shown below:

Column 1, line 24, "releates" should be -- relates --.
Column 1, line 46, "melting" should be -- melt --.
Column 3, line 45, "surface" should be -- surfaces --.
Column 3, line 50, "obained" should be -- obtained --.
Column 4, line 17, "thress" should be -- three --.
Table I, last column, under "Handleometer MD CD", Figures under CD should read --
2.5
2.8
5.4
6.4
5.2
5.3
15.4
7.0
2.9
20.8
56.0
22.0
102.0
4.3
3.0 --
Table I, footnote 7, "FS 2,000, CT 20"/min., CH"/min." should read -- FS 2,000, CT 20"/min., CH 20"/min. --.
Column 5, line 49, "describe" should be -- described --.
Claim 1, last line, "means" should be -- means. --.

Signed and sealed this 24th day of December 1974.

(SEAL)
Attest:

McCOY M. GIBSON JR.
Attesting Officer

C. MARSHALL DANN
Commissioner of Patents